Sept. 24, 1940.        S. R. OGILBY        2,215,562
METHOD OF FORMING RUBBER ARTICLES
Filed April 7, 1939

DEPOSITION BASE

↓ *Coat with heat-gelling latex composition containing a latex coagulant.*

DEPOSITION BASE COATED WITH
FLUID LATEX COMPOSITION

↓ *Heat*

DEPOSITION BASE COATED WITH
LATEX GEL CONTAINING A COAGULANT

↓ *Dip in latex composition coagulable by coagulant in latex gel on deposition base.*

DEPOSITION BASE COATED WITH
RUBBER COAGULUM

INVENTOR.
STEWART R. OGILBY
BY Lester G. Budley
ATTORNEY.

Patented Sept. 24, 1940

2,215,562

UNITED STATES PATENT OFFICE 2,215,562

METHOD OF FORMING RUBBER ARTICLES

Stewart R. Ogilby, Staten Island, N. Y., assignor to United States Rubber Company, New York, N. Y., a corporation of New Jersey Application April 7, 1939, Serial No. 266,534

6 Claims. (Cl. 18—58)

This invention relates to methods of forming rubber articles and more particularly to methods of forming rubber articles directly by deposition of rubber from latex.

In my prior Patent 1,969,275, there is described a method of producing rubber articles by coating a form or deposition base with a fluid rubber cement containing an aqueous solution of a latex coagulant and a proportion of alcohol relative to the rubber solvent insufficient to cause incipient flocculation of the rubber, allowing the volatile constituents of the composition to evaporate until the coating sets to a non-flowing gel or porous rubber layer, and then associating the thus treated base with latex as by an immersion process for a time sufficient to deposit the desired amount of coagulum on the form by migration of the coagulant into the latex. The rubber deposits formed in this manner may be dried and stripped from the form, or may remain as a coating on the base as part of the finished article. This process has many advantages over the prior processes of forming rubber articles by direct deposition from latex as fully discussed in the prior patent. The utilization, however, of rubber solvents, such as naphtha, to produce the rubber cement, and of desolvating agents, such as alcohol, to maintain the rubber cement and coagulant composition fluid until after the evaporation of the solvent on the base produces flocculation of the rubber and setting of the film, are undesirable from a cost and hazard viewpoint. The present invention is an improvement over the process of my prior Patent 1,969,275 and provides a method of depositing from a latex composition on the surface of a form or deposition base a rubber gel containing a reservoir of coagulant for subsequent treatment with conventional latex compositions without the disadvantageous use of volatile organic solvents and desolvating agents as in the prior patent.

According to the present invention, a heat-gelling latex composition containing a latex coagulant is applied to a base and heated to form a gel. The term "gelling" is used herein in its accepted sense as applied to a latex compound to signify the change of state of the rubber from a dispersed state to a state wherein the rubber forms a continuous phase in the form of a network in the pores or cells of which is included the whole of the dispersion medium, thereby forming a gel having a homogeneous structure. The thus formed deposit containing the coagulant is then associated with a second latex composition which is coagulable by the coagulant in the first latex composition, that is a second latex which has not been protected against coagulation by the coagulant, whereby the second latex composition becomes coagulated on the surface of the first deposit.

In prior methods where an acid latex on the surface of a form has been utilized to coagulate an alkaline latex as in a second dipping bath, the acid latex has not been capable of gelling on heating and hence only a thin film of the acid or coagulating latex could be applied to the form and only by careful control of its drying before dipping into the alkaline latex could the first coagulating layer be evenly distributed on the surface of the form for the subsequent dipping operation.

With the present invention, the coagulating layer is evenly distributed over the surface of the form immediately on gelling, and any desired thickness of the coagulant film may be built up since the form may be heated and dipped in a latex composition containing the coagulant and a film built up whose thickness is dependent only on the length of time the form is held in the latex. I have found that the latex composition containing the coagulant will be readily protected against coagulation at room temperature but not protected at elevated temperature in the presence of a condensation product of a straight chain aliphatic alcohol having at least 6 carbon atoms with a polyglycol compound containing at least 4 ethenoxy groups. The commercial name of one such condensation product is "Emulphor-O," believed to be the condensation product of tetra-ethylene glycol with oleyl alcohol. The addition of other protectives, such as heat-coagulable proteids, may also be used to stabilize the latex containing the coagulant at room temperature but not at elevated temperature, but these materials may leave undesirable residues in the final rubber product.

It has been found that up to 5% of "Emulphor-O," for example, permits a latex composition of over 30% solids content to be acidified as far as a pH of 1 and yet the "Emulphor-O" will lose its power to protect the latex at elevated temperatures and the latex composition will gel on heating. A gelled deposit equivalent to .10 inch thickness of rubber after drying can be formed by dipping a mold heated to between 80° C. and 100° C. for ½ to 1½ minutes in a latex composition of 50% rubber concentration containing "Emulphor-O" and having a pH of 4.4. A form coated with such a gel containing acidic material can then be dipped in a latex composition which is coagulable by the acid in the gel and be permitted to remain in the latex until any desired thickness of film has been built up. If desired, the form can first be dipped in the latex containing the latex coagulant and the protecting condensation product at room temperature and removed without heating, and then be heated to give a rubber gel containing the desired latex coagulant and having a thickness equivalent after drying to .002 to .003 inch. Such a film is much thinner and hence contains less latex coagulant than where the form is heated on or prior to immersion in the heat-gelling latex, but the elimination of the introduction into the bath of the heated form prevents destabilization of the bath as a whole by the gradual rise in temperature incident to the repeated introduction of the heated forms.

The "Emulphor-O," or other protective which stabilizes the coagulant latex composition at room but not at elevated temperatures, may similarly be used to produce a heat-gelling latex composition containing a polyvalent metal salt instead of acid as the latex coagulant. Such a latex can be applied to the surface of a form and gelled thereon and then used to build up a film of the desired thickness by dipping in a latex composition which has not been protected against the coagulating action of the polyvalent metal salt. In these dipping processes with polyvalent metal salts as the coagulant, it is preferred that the heat gelling latex composition have an acid reaction, since it is difficult to obtain a large concentration of many coagulant salts in alkaline latex compositions, because of the hydrolysis of the salt and the precipitation of insoluble polyvalent metal hydroxides. By lowering the pH below 7 when the latex coagulant to be utilized in the heated gel is primarily a polyvalent metal salt, it is possible to obtain a gel having a relatively higher concentration of the coagulant salt. The gelled latex containing the coagulant may be partially or completely dried before being associated with the latex composition which is coagulable by it providing of course the drying does not volatilize sufficient coagulant to prevent coagulation of the second latex. Instead of dipping forms into the latex compositions, methods involving the spraying of latex on forms may be used. Also, the latex containing the coagulant and protective may be gelled in a mold in a known manner and the gelled deposit be removed from the mold and, after drying, if desired, be dipped in or otherwise associated with the unprotected latex composition.

The following examples are illustrative of the invention:

Example 1

A latex composition stable at room temperature was prepared according to the following formula:

| | Parts by weight |
|---|---|
| Latex { Rubber | 100 |
| Water | 62 |
| NH₃ | .2 |
| 25% aqueous solution of "Emulphor-O" | 12 |
| 15% aqueous solution of acetic acid | 25 |

The pH of the above latex composition was 4.4. A glass form heated to 97° C. was dipped into this latex and allowed to remain for 2 minutes before being removed. This dip gave a non-fluid deposit of gelled latex .2 inch thick, which on drying gave a film thickness of .1 inch.

Another form heated to 97° C. was dipped into the above latex composition and allowed to remain ten seconds, during which time a deposit of gelled latex equivalent to a dried film thickness of about .01 inch was formed. The form with the adherent gelled latex deposit was then dipped in a conventional latex dipping compound, allowed to remain for one minute, removed and dried. This gave a thickness of the final product of .025 inch. The conventional latex dipping compound was made according to the following formula:

| | Parts by weight |
|---|---|
| Latex { Rubber | 100 |
| Water | 61 |
| NH₃ | .8 |
| 35% aqueous solution of formaldehyde | 4.9 |
| 20% aqueous solution of KOH | 3 |
| 20% aqueous solution of potassium oleate | 2.5 |
| Sulphur | .7 |
| Zinc oxide | 2 |
| Accelerator | 1 |
| Antioxidant | .5 |
| Water to 57% solids. | |

Example 2

A latex composition stable at room temperature was prepared according to the following formula:

| | Parts by weight |
|---|---|
| Latex { Rubber | 100 |
| Water | 62 |
| NH₃ | .8 |
| 25% aqueous solution of "Emulphor-O" | 12 |
| 15% aqueous solution of acetic acid | 17.4 |
| Sulphur | 3 |
| Accelerator | .5 |
| Aqueous solution magnesium acetate | 100 |

The solution of magnesium acetate was made by dissolving 7 parts by weight of pure calcined magnesia in a mixture of 22 parts by weight of glacial acetic acid and 71 parts by weight of water. The pH of the magnesium acetate solution was 5.5. The pH of the latex compound was 6.0. A glass form heated to 97° C. was dipped into this latex composition and immediately removed. This "in and out" dipping of the form gave a gelled film equivalent to a dried deposit of about .01 inch in thickness. The form with the gelled coating of the above latex composition was then dipped in a conventional latex dipping compound and allowed to remain for three minutes. The form was then removed and the deposit dried. The final article had a gauge of .03 inch in thickness. The conventional latex dipping compound was made according to the following formula:

| | Parts by weight |
|---|---|
| Latex { Rubber | 100 |
| Water | 60 |
| NH₃ | .3 |
| 37% aqueous solution of formaldehyde | 1.1 |
| 20% aqueous solution of KOH | 4.5 |
| 20% aqueous solution of potassium oleate | 1.25 |
| Sulphur | 1.5 |
| Zinc oxide | 2 |
| Accelerator | 1.2 |
| Antioxidant | .1 |
| Water to 55% solids. | |

It is understood that the form may be dipped at room temperature in the heat-gelling latex composition containing the latex coagulant and the deposit heated to gel the same after removal and before dipping in the second latex composition which is coagulable by the coagulant in the gelled deposit. In view of the many changes and modifications that may be made without departing from the principles underlying the invention, reference should be made to the appended claims for an understanding of the scope of the invention.

Having thus described my invention, what I claim and desire to protect by Letters Patent is:

1. The method which comprises applying to a base a heat-gelling latex composition containing a latex coagulant and forming on said base a gelled deposit of said latex composition by the application of heat, and associating the thus formed deposit with a second latex composition coagulable by the coagulant in the deposit.

2. The method which comprises applying to a base a heat-gelling latex composition containing a latex coagulant and a condensation product of a straight chain aliphatic alcohol having at least 6 carbon atoms with a polyglycol compound containing at least 4 ethenoxy groups and forming on said base a gelled deposit of said latex composition by the application of heat, and associating the thus formed deposit with a second latex composition coagulable by the coagulant in the deposit.

3. The method which comprises applying to a base a heat-gelling latex composition containing a latex coagulant and "Emulphor-O" and forming on said base a gelled deposit of said latex composition by the application of heat, and associating the thus formed deposit with a second latex composition coagulable by the coagulant in the deposit.

4. The method which comprises dipping a form in a heat-gelling latex composition containing a latex coagulant and producing a layer of gelled deposit of said latex composition by the application of heat, dipping the thus treated form in a second latex composition coagulable by the coagulant in the deposit, and maintaining the form in said second latex composition until the desired thickness of rubber deposit has been built up on the form.

5. The method which comprises dipping a form in a heat-gelling latex composition containing a latex coagulant and a condensation product of a straight chain aliphatic alcohol having at least 6 carbon atoms with a polyglycol compound containing at least 4 ethenoxy groups and producing a layer of gelled deposit of said latex composition by the application of heat, dipping the thus treated form in a second latex composition coagulable by the coagulant in the deposit, and maintaining the form in said second latex composition until the desired thickness of rubber deposit has been built up on the form.

6. The method which comprises dipping a form in a heat-gelling latex composition containing a latex coagulant and "Emulphor-O" and producing a layer of gelled deposit of said latex composition by the application of heat, dipping the thus treated form in a second latex composition coagulable by the coagulant in the deposit, and maintaining the form in said second latex composition until the desired thickness of rubber deposit has been built up on the form.

STEWART R. OGILBY.